United States Patent
Kobayashi et al.

(10) Patent No.: US 11,609,790 B2
(45) Date of Patent: Mar. 21, 2023

(54) RESOURCE RESERVATION MANAGEMENT DEVICE AND RESOURCE RESERVATION MANAGEMENT METHOD

(71) Applicant: Nippon Telegraph and Telephone Corporation, Tokyo (JP)

(72) Inventors: Hiroaki Kobayashi, Tokyo (JP); Naoki Takada, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 142 days.

(21) Appl. No.: 17/058,022

(22) PCT Filed: May 24, 2019

(86) PCT No.: PCT/JP2019/020580
§ 371 (c)(1),
(2) Date: Nov. 23, 2020

(87) PCT Pub. No.: WO2019/230576
PCT Pub. Date: Dec. 5, 2019

(65) Prior Publication Data
US 2021/0200594 A1    Jul. 1, 2021

(30) Foreign Application Priority Data
Jun. 1, 2018   (JP) .............................. JP2018-105867

(51) Int. Cl.
*G06F 9/46*   (2006.01)
*G06F 9/50*   (2006.01)
*G06F 9/54*   (2006.01)

(52) U.S. Cl.
CPC .......... *G06F 9/5027* (2013.01); *G06F 9/5022* (2013.01); *G06F 9/542* (2013.01); *G06F 2209/504* (2013.01); *G06F 2209/508* (2013.01)

(58) Field of Classification Search
CPC ...... G06F 9/5027; G06F 9/5022; G06F 9/542; G06F 2209/504; G06F 2209/508
See application file for complete search history.

(56) References Cited

U.S. PATENT DOCUMENTS

2003/0131165 A1   7/2003  Asano et al.
2004/0193674 A1   9/2004  Kurosawa et al.
(Continued)

FOREIGN PATENT DOCUMENTS

JP   2002-163241   6/2002
JP   2003-203126   7/2003
(Continued)

OTHER PUBLICATIONS

Aws.amazon.com. [online]. "Amazon EC2 Reserved Instance," 2018, retrieved on Apr. 6, 2018, retrieved from URL<https://aws.amazon.com/jp/ec2/pricing/reserved-instances/>, 17 pages (with English Translation).
(Continued)

*Primary Examiner* — Diem K Cao
(74) *Attorney, Agent, or Firm* — Fish & Richardson P.C.

(57) ABSTRACT

[Problem] When resource reserved in a resource sharing system become unavailable, the reservation is efficiently transferred.
[Solution] In a resource sharing system 10, a plurality of users 20 (user terminals) share a plurality of resources 30. A resource reservation management device 42 includes: a reservation setting unit 402 that accepts a reservation request including a usage condition of the plurality of resources 30 from the user 20 and sets a usage reservation according to the usage condition to a first resource predetermined 30 in the resource sharing system 10; and a reservation changing unit 404 that re-sets the usage reservation to a second resource 30 being different from the first resource 30 in the resource sharing system 10 when a reserved resource 30

(Continued)

becomes unavailable. When a resource capacity of the second resource 30 is insufficient for the usage reservation to be re-set, the reservation changing unit 404 changes the usage condition and re-sets the usage reservation to the second resource 30.

10 Claims, 7 Drawing Sheets

(56) References Cited

U.S. PATENT DOCUMENTS

2015/0254203 A1 9/2015 Higuchi
2018/0039525 A1* 2/2018 Boss .................. G06F 9/5011

FOREIGN PATENT DOCUMENTS

| JP | 2004-302918 | 10/2004 |
| JP | 2005-234637 | 9/2005 |
| JP | 2015-166959 | 9/2015 |
| JP | 2017-33117 | 2/2017 |

OTHER PUBLICATIONS

Docs.openstack.org, [online], "Blazar, the OpenStack Reservation Service," Mar. 29, 2018, retrieved on Apr. 6, 2018, retrieved from URL<https://docs.openstack.org/blazar/latest/>, 4 pages.
Song et al., "Adaptive Resource Provisioning for the Cloud Using Online Bin Packing." IEEE Transactions on Computers, Nov. 2014, 63(11):2647-2660.

* cited by examiner

| RESERVATION IDENTIFIER | USAGE DATE AND TIME | USAGE PERIOD | USED RESOURCE |
|---|---|---|---|
| PROJECT A | FROM 2018/02/10/0:00 TO 2018/02/12/23:59 | 72 HOURS | (4 CORE, 8 GB RAM, 100 GB DISK) x 4 |

Fig. 3

RESOURCE RESERVATION MANAGEMENT DEVICE AND RESOURCE RESERVATION MANAGEMENT METHOD

CROSS-REFERENCE TO RELATED APPLICATIONS

This application is a National Stage application under 35 U.S.C. § 371 of International Application No. PCT/JP2019/020580, having an International Filing Date of May 24, 2019, which claims priority to Japanese Application Serial No. 2018-105867, filed on Jun. 1, 2018. The disclosure of the prior application is considered part of the disclosure of this application, and is incorporated in its entirety into this application.

TECHNICAL FIELD

The present invention relates to a resource reservation management device and a resource reservation management method in a resource sharing system in which resources are shared by multiple users.

BACKGROUND ART

In the known art, in cloud services such as Infrastructure as a Service (IaaS), a model in which multiple users (services, applications, and the like) share resources (computer, network, storage, and the like) and each user utilizes the resources as necessary is widespread.

On the other hand, because the shared resources are finite, it is proposed to reserve resources such that the user can reliably use the resources (for example, see NPL 1 and NPL2). In particular, in small private cloud services where resources are limited, the importance of reservation is further increased.

CITATION LIST

Non Patent Literature

NPL1: "Blazar, the OpenStack Reservation Service" [online], [Searched on May 14, 2018], Internet<URL: https://docs.openstack.org/blazar/latest/>

NPL2: "Amazon EC2 Reserved instances" [online], [Searched on May 14, 2018], Internet<URL: https://aws.amazon.com/jp/ec2/pricing/reserved-instances/>

NPL3: Weijia Song, et. al, "Adaptive Resource Provisioning for the Cloud Using Online Bin Packing", IEEE Transactions on Computers, Volume: 63, Issue: 11, November 2014

SUMMARY OF THE INVENTION

Technical Problem

In the resource sharing system as described above, when a reserved resource fails, the reservation may be transferred to another available resource (alternative resource), thereby eliminating or reducing an impact on the user.

However, when available resources luck in the system, there is a problem that some reservations may be rejected (a situation where the resources cannot be used although reserved).

The present invention is devised in view of such circumstances, and an object of the present invention is to efficiently transfer the reservation when resources reserved in a resource sharing system are unavailable.

Means for Solving the Problem

To achieve the above objectives, the invention according to first aspect provides a resource reservation management device in a resource sharing system in which a plurality of resources are shared by a plurality of user terminals, the resource reservation management device including: a reservation setting unit configured to accept a reservation request including a usage condition of the plurality of resources from the user terminal and set a usage reservation according to the usage condition to a first resource predetermined in the resource sharing system; and a reservation changing unit configured to re-set the usage reservation to a second resource being different from the first resource in the resource sharing system when the first resource predetermined becomes unavailable, wherein when a resource capacity of the second resource is insufficient for the usage reservation to be re-set, the reservation changing unit changes the usage condition and then re-sets the usage reservation to the second resource.

The invention according to eighth aspect provides a resource reservation management method in a resource sharing system in which a plurality of resources are shared by a plurality of user terminals, the method including: accepting a reservation request including a usage condition of the plurality of resources from the user terminal and setting a usage reservation according to the usage condition to a first resource predetermined; and re-setting the usage reservation to a second resource being different from the first resource in the resource sharing system when the first resource predetermined becomes unavailable, wherein in the re-setting step, when a resource capacity of the second resource is insufficient for the usage reservation to be re-set, the usage condition is changed and then the usage reservation to the second resource is re-set.

In this way, when the first resource predetermined becomes unavailable and the resource capacity of the second resource is insufficient for the usage reservation to be re-set, rejection of the usage reservation can be prevented, thus improving the convenience of the user.

According to the invention of second aspect, in the resource reservation management device according to first aspect, the reservation changing unit makes a notification including a proposed change of the usage condition to the user terminal, changes the usage condition according to the proposed change when obtaining information of an approval of the proposed change from the user terminal, and then re-sets the usage reservation to the second resource.

In this way, since the reservation can be re-set after receiving the approval of the changed contents of the usage condition from the user terminal, the usage condition can be changed based on user's intention. In particular, it is advantageous in the case where the user's situation changes every moment and the amount of change in acceptable usage condition changes.

According to the invention of third aspect, in the resource reservation management device according to first aspect, the reservation request includes a lower limit usage condition applied when the usage reservation according to the usage condition cannot be set, and the reservation changing unit changes the usage condition based on the lower limit usage condition and then re-sets the usage reservation to the second resource.

In this way, the usage condition can be changed within the range of the lower limit usage condition previously specified by the user terminal to reflect the user's intention on the changed contents of the usage condition. In addition, since the lower limit usage condition is acquired in the reservation request, the reservation can be re-set more quickly as compared to the case where the user is confirmed the lower limit usage condition at re-setting of the reservation.

According to the invention of fourth aspect, in the resource reservation management device according to third aspect, the usage condition includes a plurality of items, the reservation request includes priorities for the plurality of items, and the reservation changing unit changes the usage condition such that an item of the plurality of items with a higher priority has a less change from the usage condition included in the reservation request.

In this way, a certain item in the usage condition can be prioritized, thus improving the convenience of the user.

According to the invention of fifth aspect, in the resource reservation management device according to third aspect, the reservation changing unit uses an algorithm that resolves Bin Packing problem to change the usage condition so as to maximize the number of a plurality of the usage reservations which are executable.

In this way, the reservation may be optimized in the overall resource sharing system, thereby preventing only certain users from suffering disadvantages (such as reservation rejection).

According to the invention of sixth aspect, in the resource reservation management device according to first aspect, the reservation request includes a lower limit usage condition applied when the usage reservation according to the usage condition cannot be set, and the reservation changing unit makes a notification including a proposed change of the usage condition to the user terminal, changes the usage condition according to the proposed change when obtaining information of an approval of the proposed change from the user terminal, and then re-sets the usage reservation to the second resource, and changes the usage condition based on the lower limit usage condition when obtaining no information of the approval of the proposed change from the user terminal, and then re-sets the usage reservation to the second resource.

This makes it possible to achieve both convenience for the user (change of usage condition according to the user's intention) and rapidity when re-setting the usage reservation.

In the invention according to seventh aspect, in the resource reservation management device according to any one of first to sixth aspect, the reservation setting unit suspends accepting a new instance of the reservation request while the reservation changing unit re-sets the usage reservation.

This can prevent the transfer of the original usage reservation from being rejected due to the new reservation.

Effects of the Invention

According to the present invention, the reservation can be efficiently transferred when resource reserved in the resource sharing system become unavailable.

BRIEF DESCRIPTION OF DRAWINGS

FIG. 3 is an explanatory diagram schematically illustrating an example of a resource reservation request.

DESCRIPTION OF EMBODIMENTS

Hereinafter, a preferred embodiment (hereinafter referred to as embodiment) of a resource reservation management device 42 and a resource reservation management method according to the present invention will be described in detail with reference to the accompanying drawings.

Figure 1:
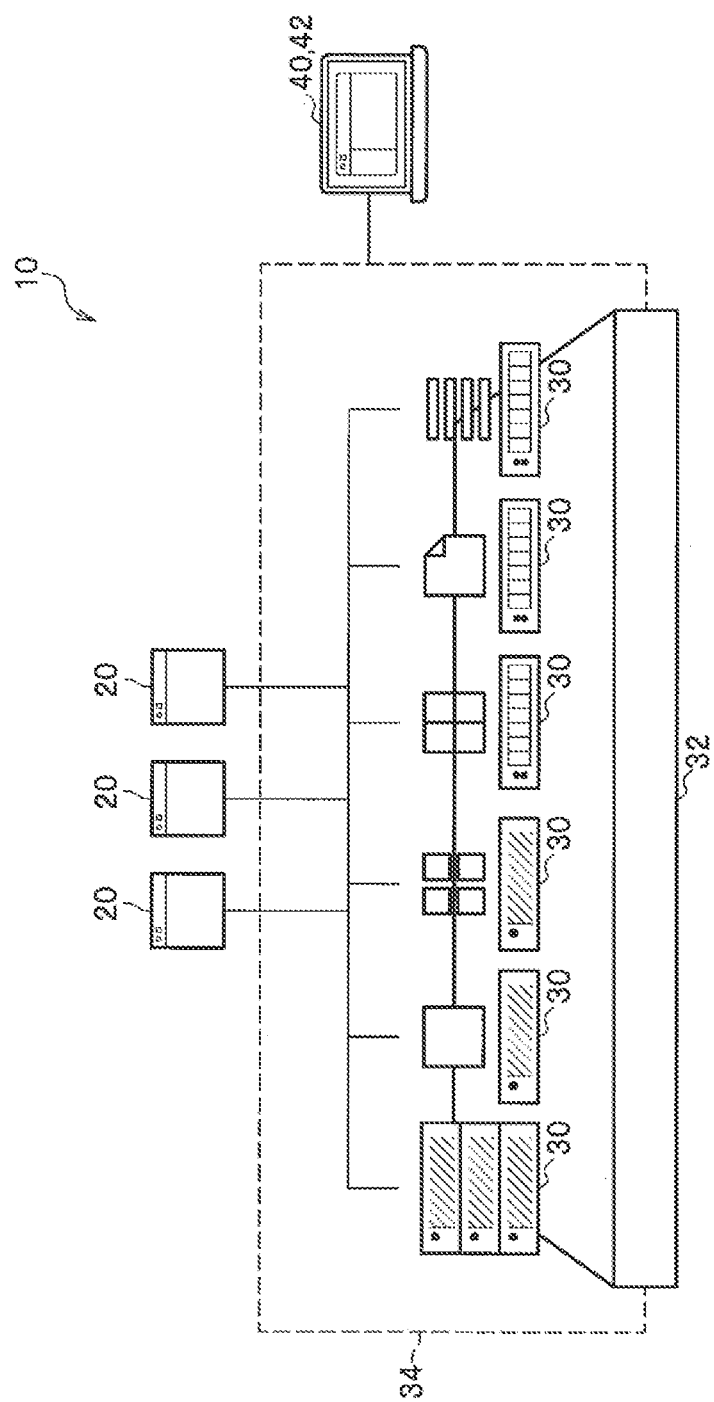
FIG. 1 is a view illustrating exemplary configuration of a resource sharing system according to the present embodiment.

FIG. 1 illustrates an exemplary configuration of a resource sharing system 10 according to the present embodiment.

The resource sharing system 10 is a system for sharing a plurality of resources 30 with a plurality of users 20.

Each of the users 20 is, for example, a user terminal (not illustrated) that stores an application for achieving resource sharing therein. The resource 30 is, for example, bare metal, virtual machine, container, and various storages. Each resource 30 is connected to a common network 32 and is managed by a cloud operating system 34 such as OpenStack.

The cloud operating system 34 is managed through a dashboard on a system management device 40 and is configured to enable an administrator to provision the resource 30 through a web interface. The system management device 40 also monitors the resource sharing system 10 and provides a tool.

Here, in the resource sharing system 10, the user 20 can reserve the resource 30 using a service such as Blazar. In the present embodiment, the system management device 40 functions as the resource reservation management device 42 that manages a reservation of the resource 30.

Figure 2:
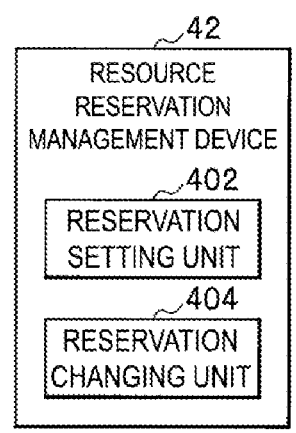
FIG. 2 is a block diagram illustrating a functional configuration of a resource reservation management device according to the present embodiment.

FIG. 2 is a block diagram illustrating a functional configuration of the resource reservation management device 42 according to the present embodiment.

The resource reservation management device 42 is embodied as a computer or the like provided with control means, storage means, and input/output means (all not illustrated). The control means includes a reservation setting unit 402 and a reservation changing unit 404.

The reservation setting unit 402 accepts a reservation request including usage condition of the resource 30 from the user 20, and sets a usage reservation according to the usage condition to a first resource predetermined 30 in the resource sharing system 10. Note that the reservation setting unit 402 suspends accepting a new reservation request while the reservation changing unit 404, described below, re-sets the usage reservation.

When the first resource predetermined 30 is unavailable, the reservation changing unit 404 re-sets (transfers) the usage reservation to a second resource 30 being different from the first resource 30 in the resource sharing system 10. The case where the resource 30 is unavailable is, for example, when the resource 30 fails, a failure occurs in a network between the resource 30 and the user 20, and the like. Hereinafter, the reservation that has been set to the unavailable resource 30 is referred to as "reservation to be changed".

FIG. 3 schematically illustrates an example of the reservation request for the resource 30. The reservation request from the user 20 includes, for example, a reservation identifier ("project A" in the example in FIG. 3) that identifies the reservation, usage date and time ("from 2018/02/10/0:00 to 2018/02/12/23:59" in the example of FIG. 3) using the resource 30, a usage period ("72 hours" in the example in FIG. 3) of the resource 30, and type and capacity ("4 devices of 4 Core, 8 GB RAM, and 100 GB disk in the example in FIG. 3) of the resource 30 to be used.

When receiving the reservation request, the reservation setting unit 402 sets the usage reservation according to usage condition to the resource 30 in the resource sharing system 10. The reservation state for each resource 30 is managed in a reservation table as illustrated in FIG. 4, and a right to use the resource 30 is given to the user 20 according to the reservation table.

Figure 4:
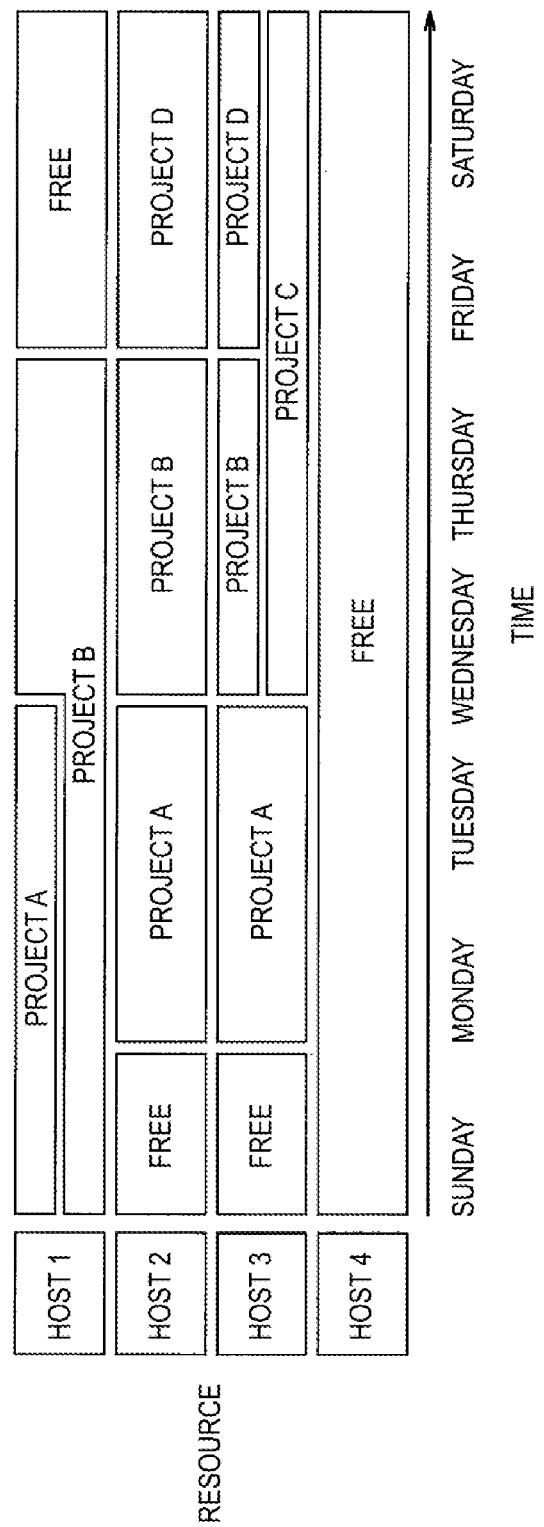
FIG. 4 is an explanatory diagram schematically illustrating a resource reservation table.

FIG. 4 is an explanatory diagram schematically illustrating the reservation table for the resource 30.

In the example of FIG. 4, four host machines (hosts 1 to 4) are illustrated as the resource 30. For example, the host 2 is free (available state) on Sunday and is reserved by a project A on Monday and Tuesday, a project B on Wednesday and Thursday, and a project D on Friday and Saturday.

In addition, when the resource capacity of one resource 30 is sufficient, a plurality of users 20 may simultaneously reserve the one resource 30. For example, the host 1 is reserved by the project A and the project B from Sunday through Tuesday. That is, one resource 30 can also be partially reserved.

Figure 5:
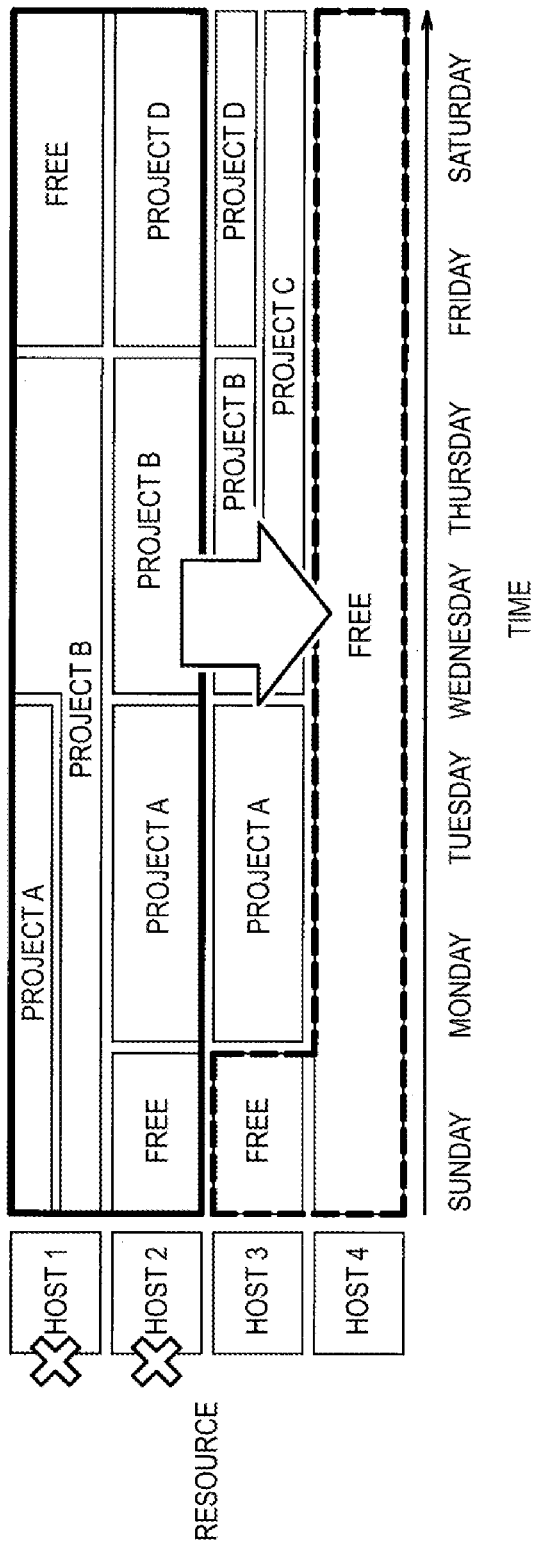
FIG. 5 is an explanatory diagram schematically illustrating the resource reservation table.

Here, when the host 1 and the host 2 fail and become unavailable in the reservation state illustrated in FIG. 4, the usage reservations set to the host 1 and the host 2, that is, the reservations surrounded with a thick solid line in FIG. 5 become the reservations to be changed. In this case, the reservation changing unit 404 basically transfers the reservations to other normal resource 30 (the host 3 and the host 4).

For example, in the illustrated example, a region surrounded with a thick dotted line in FIG. 5, that is, the host 4 is free (available) on all day of week, and the host 3 is free (available) on Sunday and thus the reservation changing unit 404 transfers the reservations to be changed to these available resource 30. However, if specifications of the hosts 1 to 4 are equivalent, from Monday onward, the resource capacity of the available resource 30 becomes a half of the resource capacity necessary for the reservations to be changed, such that all of the reservations to be changed cannot be transferred.

When the resource capacity of the normal resource 30 (the second resource 30) is insufficient for the usage reservations to be re-set, the reservation changing unit 404 changes the usage condition of the usage reservation and then re-sets the usage reservations to the second resource 30.

By changing the usage condition for the usage reservation, the limited resource 30 may be used more efficiently, minimizing an impact on the user 20 due to a fact that the resource 30 becomes unavailable.

Reservation acceptance processing of the resource reservation management device 42 will be described before describing reservation change processing of the reservation changing unit 404 in more detail.

Figure 6:
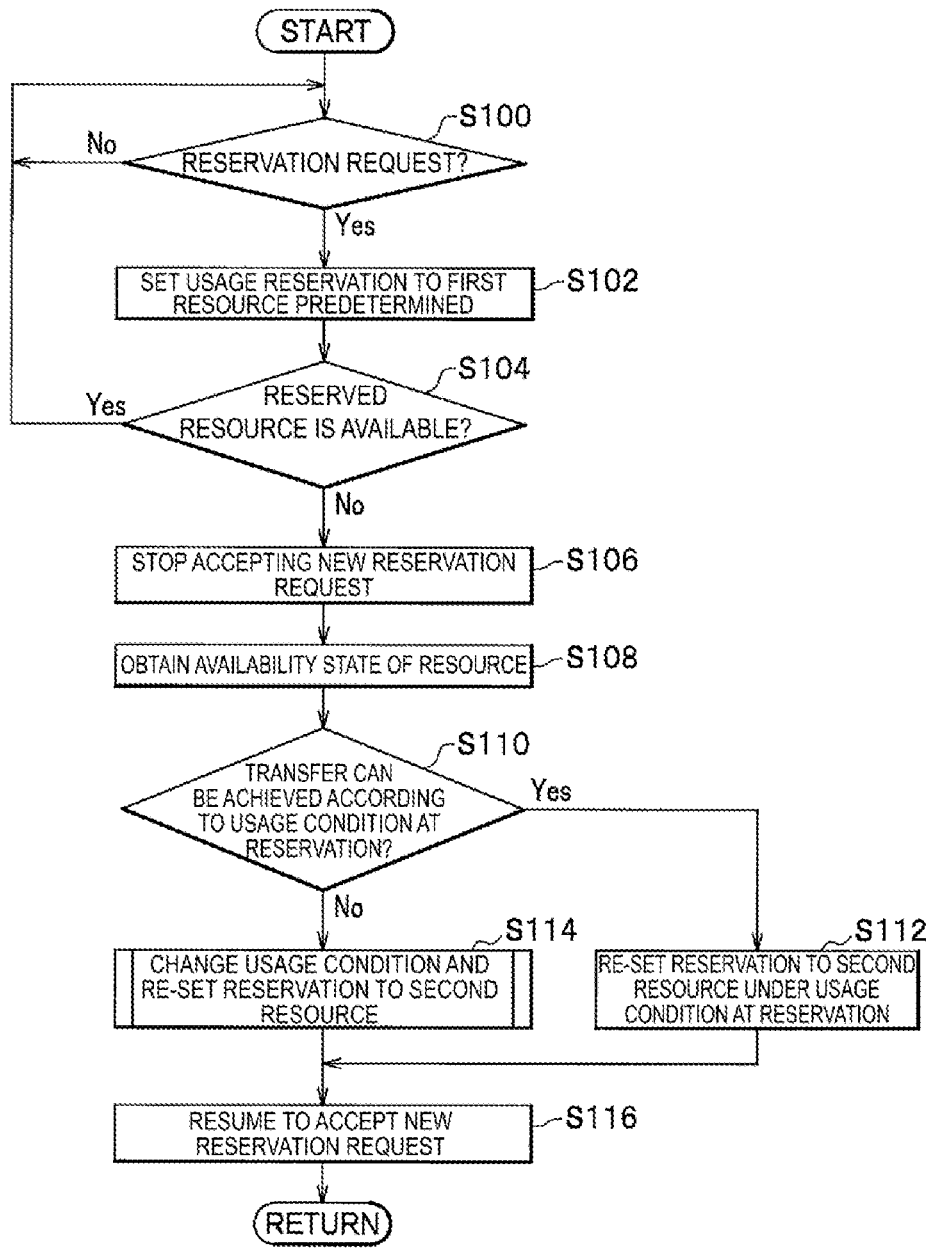
FIG. 6 is a flowchart illustrating a procedure of reservation acceptance processing of the resource reservation management device.

FIG. 6 is a flow chart illustrating a procedure of the reservation acceptance processing of the resource reservation management device 42.

First, the reservation setting unit 402 of the resource reservation management device 42 determines whether a reservation request has been received from the user 20 (user terminal) (step S100). Then, when the reservation request has been received (step S100: Yes), the reservation setting unit 402 sets the usage reservation to the first resource predetermined (the resource 30 specified by the user 20) (step S102). On the other hand, when the reservation request has not been received (step S100: No), the reservation setting unit 402 waits for reception.

When the resource 30 for which the usage reservation is set has no failure and is available (step S104: Yes), the reservation setting unit 402 returns to the step S100 and continues to accept the usage reservation. Note that although not illustrated in the drawings, when the usage date and time set in the usage reservation is reached, the resource reservation management device 42 appropriately gives a right to use the resource 30 to the user 20 (execution of the reservation).

On the other hand, when the resource 30 for which the usage reservation is set has a failure and the like and becomes unavailable (step S104: No), the reservation setting unit 402 suspends accepting a new reservation request (step S106).

This is to prioritize the transfer of the usage reservation (reservation to be changed) for the unavailable resource 30 over the acceptance of a new reservation. This can prevent the transfer of the original usage reservation from being rejected due to the new reservation.

In addition, the reservation changing unit 404 acquires information on the availability state of available resource 30 (the second resource 30) (step S108), and determines whether the usage reservation for the unavailable resource 30 can be transferred to the second resource 30 according to the usage condition (usage date and time, resource capacity, and the like) at the reservation (step S110).

When the usage reservation can be transferred to the second resource 30 according to the usage condition at the reservation, for example, the capacity of the resource 30 is sufficient (step S110: Yes), the reservation changing unit 404 re-sets the reservation to be changed to the second resource 30 under the usage condition at the reservation (step S112).

On the other hand, when the usage reservation cannot be transferred according to the usage condition at the reservation, for example, when the capacity of the resource 30 is insufficient (step S110: No), the reservation changing unit 404 changes the usage condition for the reservation to be changed and then re-sets the reservation to the second resource 30 (step S114). Details of a method for changing the usage condition will be described below.

When the transfer of the usage reservation is completed, the reservation setting unit 402 resumes to accept a new reservation request (step S116). Note that, after resuming acceptance of the reservation, the usage reservation is assigned to only the available resource 30.

Next, details of the method for changing the usage condition at the transfer of the reservation (step S114 in FIG. 6) will be described.

In the present embodiment, the following three approaches are exemplified as the method for changing the usage condition at the transfer of the reservation.

Approach 1: Change after inquiring to user 20
Approach 2: Change based on reservation change policy
Approach 3: Mixed Type of approach 1 and approach 2
For example, the operator of the resource sharing system 10 selects any of the above approaches 1 to 3 and sets the selected approach to the reservation changing unit 404. Details of each approach will be described.

Approach 1: Change After Inquiring to User 20

According to the approach 1, when the transfer cannot be performed according to the usage condition at the reservation, possibility that the reservation can be rejected is notified to the user 20. This notification includes a proposed change of the usage condition. The proposed change of the usage condition is a suggestion, for example, "reservation available by delaying the start time of usage by one hour". "reservation available by reducing the number of resources by one), or the like. In addition, for example, information on an availability state list of the resource 30 may be transmitted to the user 20 such that the user 20 may determine a change destination (changed usage condition) of the reservation.

When the notified user 20 approves the proposed change (for example, when the user 20 changes the reservation condition based on the suggestion and transmits a reservation change request), the reservation changing unit 404 transfers the usage reservation to the second resource 30 according to the proposed change.

In other words, in the approach 1, the reservation changing unit 404 makes a notification including the proposed change of the usage condition to the user 20, changes the usage condition according to the proposed change when the user 20 approves the proposed change, and then re-sets the usage reservation to the available second resource 30.

In this way, since the reservation can be re-set after the user 20 approves the changed contents of the usage condition, the usage condition can be changed based on the user's intention. In particular, it is advantageous in the case where the user's situation changes every moment and the amount of change in acceptable usage condition changes.

Figure 7:
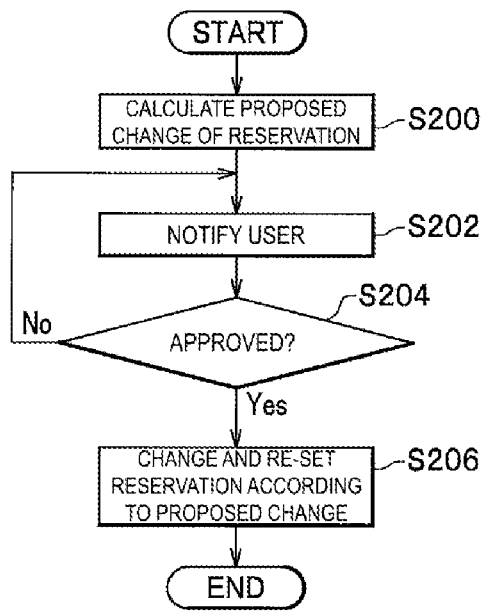
FIG. 7 is a flowchart illustrating a procedure of usage condition change processing at transfer of reservation according to an approach 1.

FIG. 7 is a flowchart illustrating a procedure of usage condition change processing at the transfer of the reservation according to the approach 1.

The reservation changing unit 404 calculates a proposed change of the usage condition for the reservation to be changed based on the availability state of the available resource 30 (the second resource 30) acquired in the step S108 in FIG. 6 (step S200) and transmits a notification including the proposed change to the user 20 (step S202). When the user 20 approves the proposed change (step S204: Yes), the reservation changing unit 404 changes the usage condition according to the proposed change and then re-sets the reservation (step S206).

Note that, when the proposed change is not approved (step S204: No), another proposed change may be calculated and re-transmitted, or the reservation may be canceled.

Approach 2: Change Based on Reservation Change Policy

In the approach 2, a reservation change policy is previously set for each reservation, and the reservation changing unit 404 automatically changes the usage condition according to the policy and re-sets the reservation.

More specifically, the user 20 sets minimum requirement (lower limit usage condition) of the usage condition (usage date and time, usage period, resource capacity, and the like) at the reservation request. Examples of the lower limit usage condition includes "start (or end) usage by XX hour on XX day at the latest" (usage date and time requirement). "ensure usage period of XX hours at minimum" (usage period condition), and "three hosts having at least two cores" (resource capacity condition).

When the transfer cannot be performed according to the usage condition at the reservation, the reservation changing unit 404 changes the usage condition for the reservation to be changed so as to satisfy the minimum requirement and re-sets the reservation. When the lower limit condition is not satisfied, for example, the reservation changing unit 404 notifies cancellation (failure of change) of the reservation to the user 20 without re-setting the reservation.

That is, in the approach 2, the reservation request from the user 20 includes the lower limit usage condition applied when the usage reservation according to the initial usage condition cannot be set, and the reservation changing unit 404 changes the usage condition based on the lower limit usage condition and then re-sets the usage reservation to the available second resource 30.

In this way, the usage condition can be changed within the range of the lower limit usage condition previously specified by the user 20 to reflect the user's intention on the changed contents of the usage condition. In addition, since the lower limit usage condition is acquired in the reservation request, the reservation can be re-set more quickly as compared to the case where the user 20 is confirmed the lower limit usage condition at re-setting of the reservation.

Furthermore, in the approach 2, a "method for prioritizing an item specified by a user" and a "method for optimizing the overall system" may be adopted.

Method for Prioritizing Item Specified by User

In this approach, at setting of the lower limit usage condition, the user 20 sets an item (priority item) on which the user 20 attaches great importance, and the reservation changing unit 404 changes the usage condition so as to preferentially satisfies the priority item.

Among the items of the usage condition, only a specific item may be specified as a priority condition, or a priority order may be set for the items to specify a degree of priority. For example, when the usage period is specified as the priority item, the priority is given to the usage period condition, and the usage condition is changed in a form in which the usage time and the resource capacity are compromised. In addition, for example, when the resource capacity is set as the priority item, the priority is given to the resource capacity condition, and the usage condition is changed in a form in which the usage date and time and the usage period are compromised.

Note that "prioritize the priority item" does not mean "not allowed to change the priority item", but "the degree of change of the priority item is made lower than the degree of change of the other items".

That is, when the usage condition include a plurality of items and the reservation request includes priorities for the plurality of items, the reservation changing unit 404 may change the usage condition such that an item of the plurality of items with a higher priority has a less change from the usage condition specified by the user 20.

In this way, a certain item in the usage condition can be prioritized, thus improving the convenience of the user.

Method for Optimizing Overall System

In this approach, for the all reservations set in the resource sharing system 10, including not only reservations set to the unavailable resource 30, but also reservations set to the available resource 30, the usage condition is changed based on the lower limit usage condition and the reservations are re-set.

In this case, using an overall optimization algorithm such as Bin packing (see, for example, NPL3), the reservations are re-set so as to minimize the number of reservations that fail to change the reservation.

That is, the reservation changing unit 404 uses an algorithm that resolves the Bin Packing problem to change the usage condition so as to maximize the number of usage reservations which are executable.

In this way, the reservation may be optimized in the overall resource sharing system 10, thereby preventing only certain users 20 from suffering disadvantages (such as reservation rejection).

Approach 3: Mixed Type of Approach 1 and Approach 2

In the approach 3, the reservation is changed by combining the inquiry to the user 20 as in the approach 1 with the reservation change policy as in the approach 2.

In the approach 3, similar to the approach 2, the lower limit usage condition is set at the reservation request. When the transfer cannot be achieved according to the usage condition at the reservation, the reservation changing unit 404 transmits a notification including a proposed change of the usage condition to the user 20. When the user 20 approves the proposed change, the usage condition is changed according to the proposed change and then, the reservation is re-set. On the other hand, when no response is made from the user 20 for a predetermined period (for example, three minutes), the usage condition is changed according to the reservation change policy to re-set the reservation.

That is, in the approach 3, the reservation request from the user 20 includes the lower limit usage condition applied when the usage reservation cannot be set according to the initial usage condition, and the reservation changing unit 404 transmits a notification including the proposed change of the usage condition to the user 20. Then, when obtaining an approval of the proposed change from the user 20, the reservation changing unit 404 changes the usage condition based on the proposed change and then re-sets the usage reservation to the second resource 30. When failing to obtain the approval of the proposed change from the user 20, the reservation changing unit 404 changes the usage condition based on the lower limit usage condition and then re-sets the usage reservation to the second resource 30.

This makes it possible to achieve both the convenience of the user (change of usage condition according to the user's intention) and rapidity at re-setting of the usage reservation.

Figure 8:
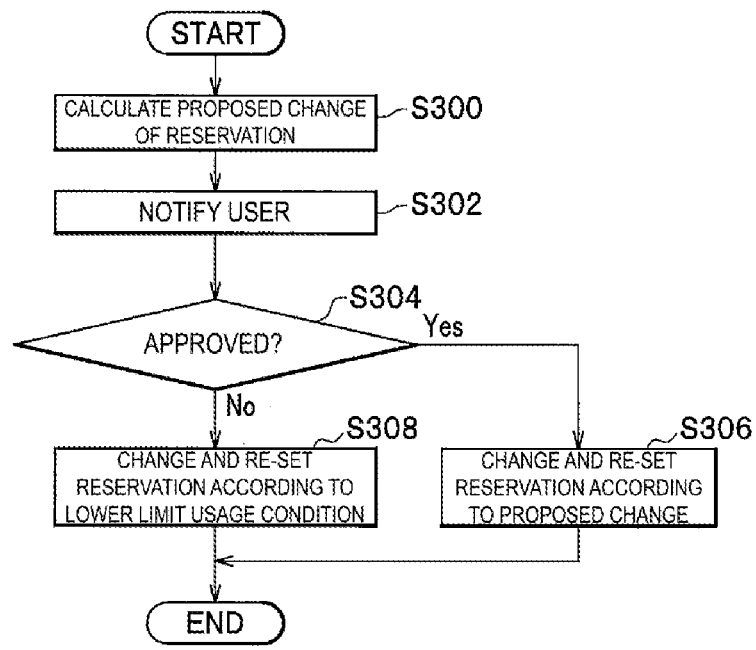
FIG. 8 is a flowchart illustrating a procedure of the usage condition change processing at transfer of reservation according to an approach 3.

FIG. 8 is a flowchart illustrating a procedure of the usage condition change processing at the transfer of the reservation according to the approach 3.

The reservation changing unit 404 calculates a proposed change of the usage condition for the reservation to be changed based on the availability state of the available resource 30 (the second resource 30) acquired in the step S108 in FIG. 6 (step S300) and transmits a notification including the proposed change to the user 20 (step S302).

When the user 20 approves the proposed change (step S304: Yes), the reservation changing unit 404 changes the usage condition according to the proposed change and then re-sets the reservation (step S306).

On the other hand, when the proposed change is not approved (step S304: No), for example, no response from the user 20 is made for a predetermined period, the reservation changing unit 404 changes the usage condition based on the lower limit usage condition included in the reservation request received in the step S100 in FIG. 6 and then re-sets the reservation (step S308).

As described above, when the first resource predetermined 30 becomes unavailable and the resource capacity of the available second resource 30 is insufficient for the usage reservation to be re-set, the resource reservation management device 42 of the resource sharing system 10 according to the present embodiment can prevent rejection of the usage reservation, thus improving the convenience of the user.

REFERENCE SIGNS LIST

10 Resource sharing system
20 User (user terminal)
30 Resource
32 Common network
34 Cloud operating system
40 System management device
42 Resource reservation management device
402 Reservation setting unit
404 Reservation changing unit

The invention claimed is:

1. A resource reservation management device in a resource sharing system in which a plurality of resources are shared by a plurality of user terminals, the resource reservation management device comprising:

a reservation setting unit, including one or more processors, configured to accept a reservation request including a usage condition of the plurality of resources from a user terminal and set a usage reservation according to the usage condition to a first resource predetermined in the resource sharing system, wherein the usage condition includes a plurality of items including a required resource capacity, a usage period, and a usage start time, and the reservation request further specifies degrees of priorities for the plurality of items; and a reservation changing unit, including one or more processors, configured to re-set the usage reservation to a second resource being different from the first resource in the resource sharing system when the first resource predetermined becomes unavailable, wherein when a resource capacity of the second resource is insufficient for the usage reservation to be re-set, the reservation changing unit is configured to change the usage condition such that a less degree of change is made to one of the required resource capacity, the usage period, or the usage start time that has a higher degree of priority, and then re-set the usage reservation to the second resource.

2. The resource reservation management device according to claim 1, wherein the reservation changing unit makes a notification including a proposed change of the usage condition to the user terminal, changes the usage condition according to the proposed change when obtaining information of an approval of the proposed change from the user terminal, and then re-sets the usage reservation to the second resource.

3. The resource reservation management device according to claim 1, wherein the reservation changing unit uses an algorithm that resolves Bin Packing problem to change the usage condition so as to maximize a number of a plurality of usage reservations which are executable.

4. The resource reservation management device according to claim 1, wherein the reservation request includes a lower limit usage condition applied when the usage reservation according to the usage condition cannot be set, and the reservation changing unit makes a notification including a proposed change of the usage condition to the user terminal, changes the usage condition according to the proposed change when obtaining information of an approval of the proposed change from the user terminal, and then re-sets the usage reservation to the second resource, and changes the usage condition based on the lower limit usage condition when obtaining no information of the approval of the proposed change from the user terminal, and then re-sets the usage reservation to the second resource.

5. The resource reservation management device according to claim 1,
wherein the reservation setting unit suspends accepting a new instance of the reservation request while the reservation changing unit re-sets the usage reservation.

6. A resource reservation management method performed by a resource reservation management device including one or more processors, in a resource sharing system in which a plurality of resources are shared by a plurality of user terminals, the method comprising:
accepting, by a reservation setting unit of the resource reservation management device, a reservation request including a usage condition of the plurality of resources from a user terminal and setting a usage reservation according to the usage condition to a first resource predetermined in the resource sharing system, wherein the usage condition includes a plurality of items including a required resource capacity, a usage period, and a usage start time, and the reservation request further specifies degrees of priorities for the plurality of items; and
re-setting, by a reservation changing unit of the resource reservation management device, the usage reservation to a second resource being different from the first resource in the resource sharing system when the first resource predetermined becomes unavailable,
wherein in the re-setting step, when a resource capacity of the second resource is insufficient for the usage reservation to be re-set, the usage condition is changed such that a less degree of change is made to one of the required resource capacity, the usage period, or the usage start time that has a higher degree of priority, and then the usage reservation to the second resource is re-set.

7. The resource reservation management method according to claim 6, further comprising:
making, by the reservation changing unit of the resource reservation management device, a notification including a proposed change of the usage condition to the user terminal, changing the usage condition according to the proposed change when obtaining information of an approval of the proposed change from the user terminal, and then re-setting the usage reservation to the second resource.

8. The resource reservation management method according to claim 6, further comprising:
using, by the reservation changing unit of the resource reservation management device, an algorithm that resolves Bin Packing problem to change the usage condition so as to maximize a number of a plurality of usage reservations which are executable.

9. The resource reservation management method according to claim 6,
wherein the reservation request includes a lower limit usage condition applied when the usage reservation according to the usage condition cannot be set, and the method further comprising:
making, by the reservation changing unit of the resource reservation management device, a notification including a proposed change of the usage condition to the user terminal, changing the usage condition according to the proposed change when obtaining information of an approval of the proposed change from the user terminal, and then re-setting the usage reservation to the second resource, and changing the usage condition based on the lower limit usage condition when obtaining no information of the approval of the proposed change from the user terminal, and then re-setting the usage reservation to the second resource.

10. The resource reservation management method according to claim 6, further comprising:
suspending, by the reservation changing unit of the resource reservation management device, accepting a new instance of the reservation request while the re-setting the usage reservation.

* * * * *